Dec. 12, 1939. G. F. WIKLE 2,183,376
DEVICE FOR SLITTING TIRE TREADS
Filed Aug. 11, 1938 4 Sheets-Sheet 2

INVENTOR.
GEORGE F. WIKLE
ATTORNEYS.

INVENTOR.
GEORGE F. WIKLE
BY
ATTORNEYS.

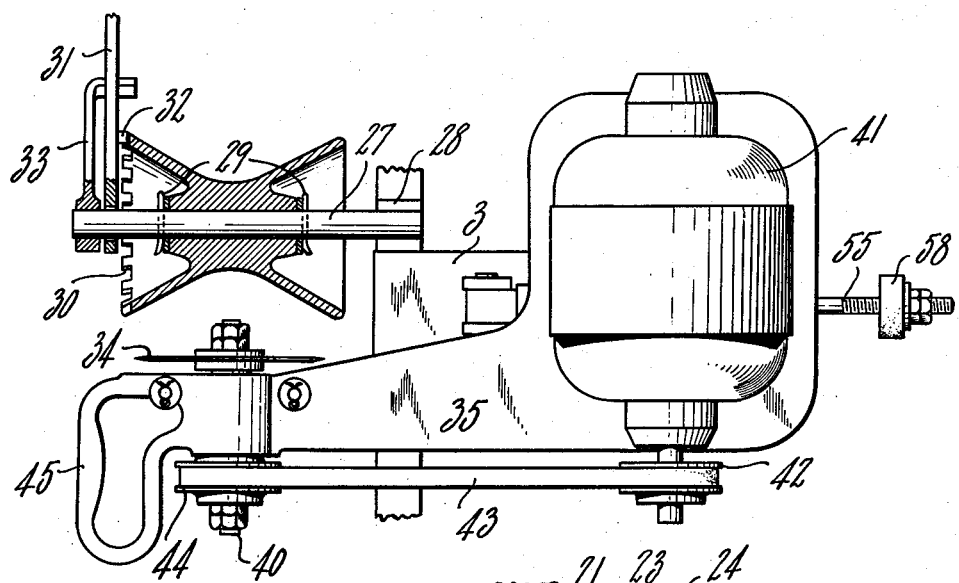
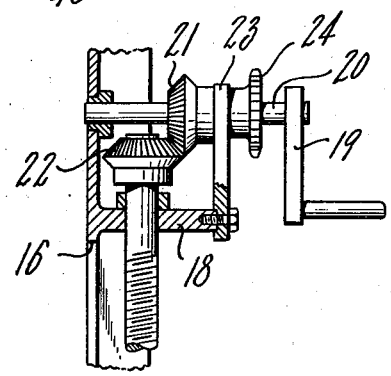
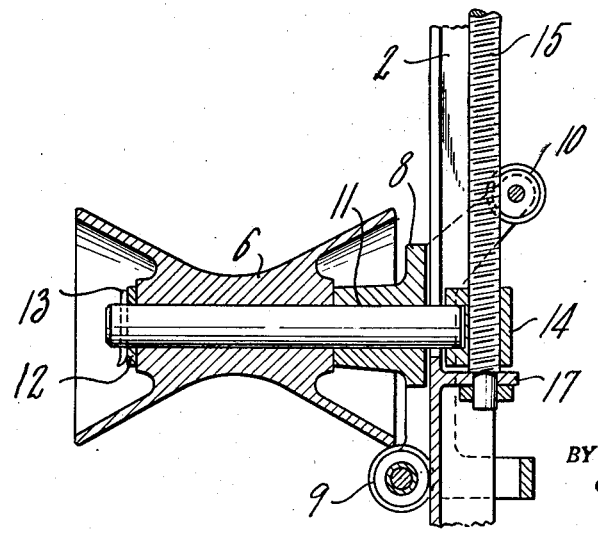

Patented Dec. 12, 1939

2,183,376

UNITED STATES PATENT OFFICE 2,183,376

DEVICE FOR SLITTING TIRE TREADS

George F. Wikle, Detroit, Mich., assignor, by mesne assignments, to United States Rubber Company, New York, N. Y., a corporation of New Jersey Application August 11, 1938, Serial No. 224,266

4 Claims. (Cl. 164—60)

This invention relates to a device for treating tire treads, and in particular it relates to a device for forming transverse slits or incisions in the treads of pneumatic tires.

The antiskid, traction and wearing qualities of pneumatic tires may be improved by providing transversely extending slits in the tread portions thereof.

I provide a device for applying such slits to the treads of pneumatic tires which is inexpensive of manufacture and economical and efficient in operation. The device is particularly useful for tire dealers or for service stations where the slitting operation may be easily and quickly performed on either new or used tires. Other objects of the invention are, to provide a device in which tires may be easily mounted, in which various sizes of tires may be accommodated without specific adjustment, in which the depth of slits may be readily controlled, and in which the spacing of slits may be fixed either at regular or variable intervals circumferentially of the tire.

These and other objects and advantages will appear more fully in the following detailed description, when considered in connection with the accompanying drawings, in which:

Fig. 4 is a view, in section, of an adjustable tire support, the section being taken along lines IV—IV of Fig. 1;

Fig. 5 is a plan view, partly in section, of the cutting mechanism and tire support;

Fig. 6 is a detail view, in section, of the cutting mechanism, the section being taken along lines VI—VI of Fig. 1; and Fig. 7 is a detail view, partly in section, of a portion of the cutting mechanism, illustrating means for limiting the depth of cuts.

Figure 1:
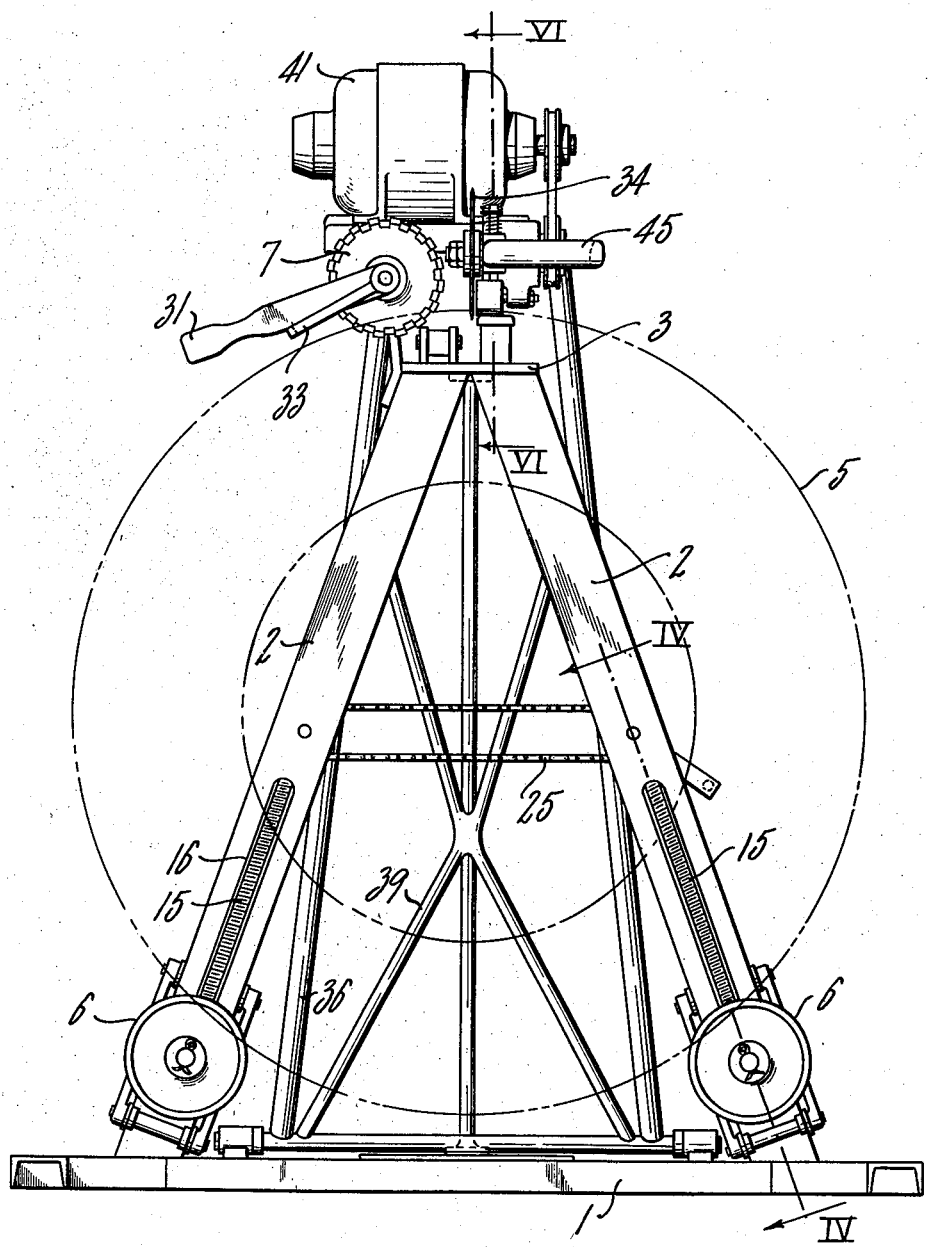
Fig. 1 is a front elevational view of a machine embodying the features of my invention.
Figure 2:
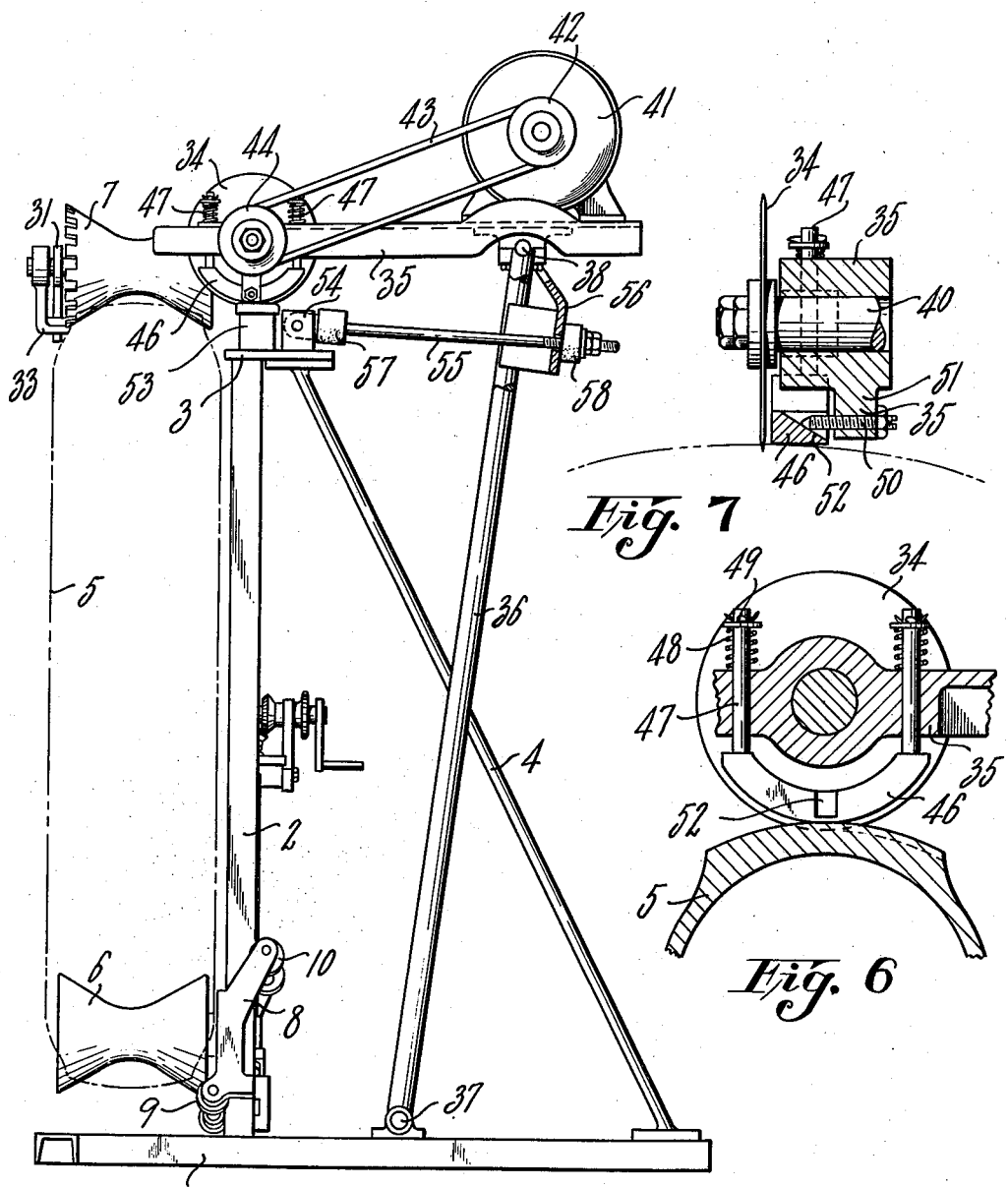
Fig. 2 is a side elevational view thereof, partly in section.

Referring to the drawings, and in particular to Figs. 1 and 2, an embodiment of my invention includes a base member 1 supporting upright members 2. A table 3 is secured to the top of the upright members 2, and a brace rod 4 attached to the base member 1 and to the table 3 completes a rigid support constituting the principal frame. The device is arranged for receiving and retaining a tire 5 in a vertical plane in front of the upright members 2. The tire rests upon a pair of sheaves 6 mounted near the base of the upright members 2. An indexing sheave 7, in combination with the sheaves 6, provides engagement means for maintaining the tire in its vertical position.

The sheaves 6, as shown in Fig. 4, are adaptable for movement parallel with the upright members 2. Carriages 8 are each provided with a roller 9 which engage with the front face of the structural upright members 2. Rollers 10, also supported by each carriage 8, contact with the rear faces of the structural members 2. A horizontal shaft 11, fastened to each carriage 8, extends therefrom and rotatably supports a sheave 6. Washers 12 and cotter keys 13 limit the axial movement of the sheaves 6 relative to the shafts 11. The opposite end of each shaft 11 projects slightly from the carriage 8 and loosely engages with a block 14 having threads for complementary engagement with a threaded shaft 15 extending parallel with each of the upright members 2. Slots 16 through the upright members 2 provide clearance for the shafts 11 in their movement parallel with the members 2.

Figure 3:
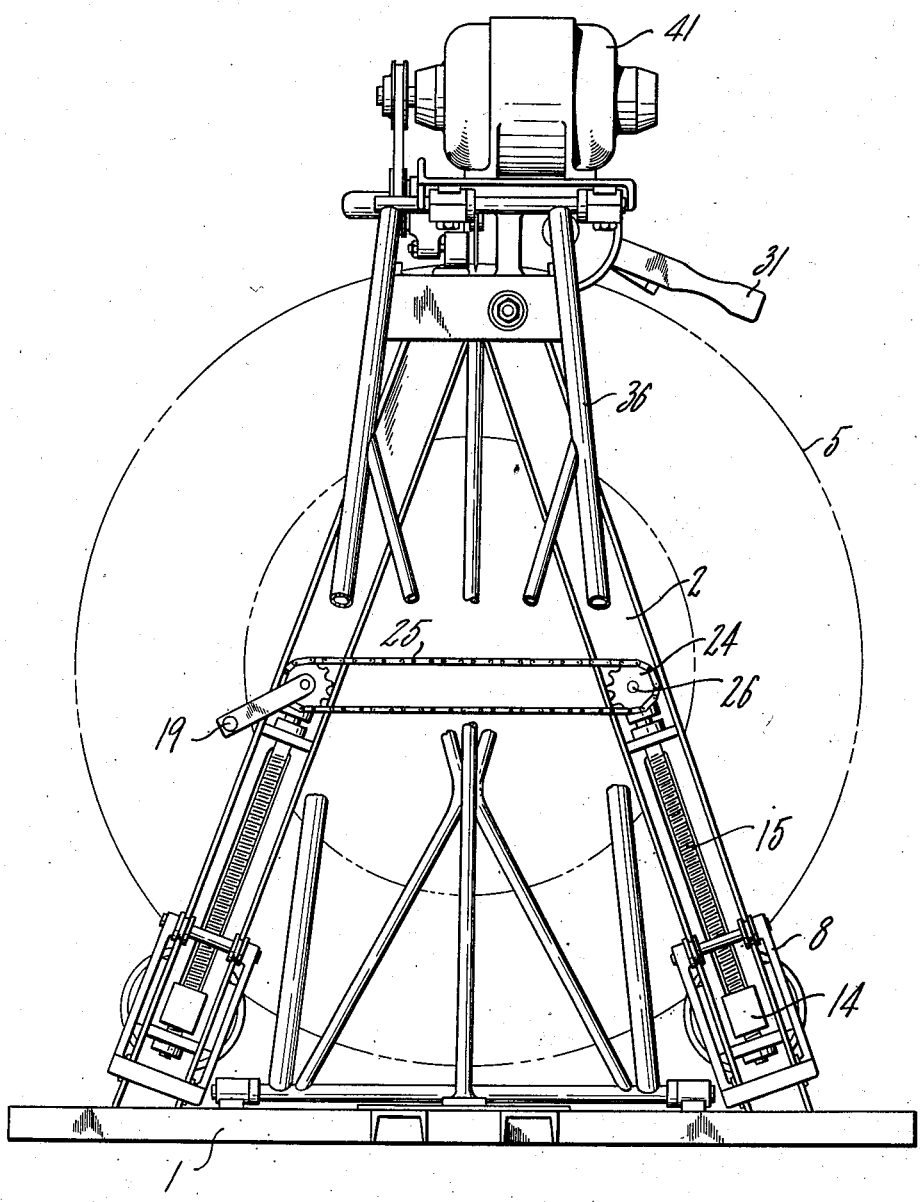
Fig. 3 is a rear elevational view of the machine, partly broken away to illustrate detail mechanisms.

A bracket 17 projecting from the rear face of each of the upright members 2 supports the lower end of the threaded shaft 15. At the upper end of each threaded shaft 15 a support is provided in the form of a bracket 18. In order to rotate the threaded shafts 15 for moving the sheaves 6 along the upright members, a hand crank 19 is provided which connects with the adjacent shaft 15 through shaft 20 and miter gears 21 and 22 attached to the shafts 20 and 15, respectively, as shown in Fig. 4. One end of the shaft 20 is supported by the upright members 2 and the opposite end is supported by an arm 23 extending from the bracket 18. A sprocket 24, attached to the shaft 20, through a chain 25 (Fig. 3) engages a similar sprocket 24 mounted on a shaft 26 associated with the second shaft 15. By this arrangement, manual operation of the crank 19 effects movement of both sheaves 6 in a direction parallel to their supporting upright members 2.

The upper indexing sheave 7 is freely rotatable on a shaft 27 (Fig. 5) rigidly supported by an arm 28 extending from the upright members 2. Cotter keys 29 maintain the sheave 7 in proper axial position relative to the shaft 27. The outer marginal portion of the sheave 7 is provided with a plurality of notches 30. A hand operable arm 31 loosely attached to the shaft 27 is provided with a lug 32 having complementary engagement with the notches 30 in the sheave 7. By this construction an operator may engage successive notches 30 with the lug 32, and by movement of the arm 31 cause the sheave to rotate a distance equal to the pitch of the notches. A stop arm 33 rigidly attached to the shaft 27 limits the movement of the arm 31. When a tire is mounted in position on the apparatus, movement of the arm 31 results in the transmission of increments of rotary movement to the tire.

Means for forming transverse slits in the tread portion of a tire are provided through a circular rotatable knife 34 (Fig. 2) mounted on a frame 35, which, in turn, is supported from the base member 1 by a brace arm 36. The arm 36 is pivotally attached at 37 to the base 1 and is pivotally attached at 38 to the frame 35. As shown in Fig. 1, the arm 36 includes reinforcing members 39 for strengthening the arm 36.

The rotatable knife 34 is supported by a shaft 40 (Figs. 2 and 7) mounted in the frame 35, and is driven from a motor 41 having a pulley 42, through belt 43, and pulley 44 attached to the shaft 40. A handle 45 forming a part of the frame 35 enables an operator to grip the pivoted frame 35 for moving the cutting assembly transversely of the tire.

Along one side of the circular knife 34 an adjustable gauge member 46 (Figs. 6 and 7) provides means for limiting the depth of the slit in the tire tread resulting from the circular knife. The gauge member 46 is retained to the frame 35 by means of guide rods 47 slidably mounted in the frame 35. Springs 48 and keys 49 function to maintain the gauge member 46 in an elevated position unless otherwise restricted. This restricting means and means for adjusting the gauge member take the form of an adjusting screw 50 threaded through a lug 51 extending from the frame 35 and engageable with the gauge member 46 through a beveled recess 52 formed on the adjusting screw side of the gauge member. Operation of the adjusting screw 50 functions to move the gauge member 46 radially of the circular knife 34, thus controlling the depth of slits desired in the tire treads.

When the cutting mechanism is not in operation the unsupported end of the frame 35 is permitted, through the gauge member 46, to rest upon a cushion block member 53 attached to the top of the table 3. Also attached to the top of the table 3 is a bracket 54 to which a rod 55 is pivotally connected. An arm 56 extending from the frame 35 loosely supports the opposite end of the rod 55. The purpose of this rod 55 is to limit the backward and forward movement of the cutting mechanism. A cushioning member 57 on the rod 55 limits the forward movement of the cutting mechanism, and a cushioning member 58 secured to the rod 55 limits the backward movement of the cutting mechanism.

In the operation of the apparatus the operator places a tire on the sheaves 6 and holds the tire in a vertical position while manually operating the crank 19. This operation moves the sheaves 6 toward the sheave 7, resulting in a clamping action of the tire therebetween. The circular knife 34 rotates continuously throughout the slitting operation.

To manipulate the cutting mechanism, the operator with one hand grips the handle 45 and in a forward motion moves the circular knife over the crown of the tire. In this operation the weight of the cutting mechanism against the tire results in the formation of a slit of proper depth in the tire tread. The maximum depth of the slit is limited by the gauge member 46. When the cutting mechanism has been moved to its advanced position transversely of the tire, the operator with his other hand grasps the arm 31 and engages the lug 32 with the next succeeding notch in the sheave 7. By moving the arm 31 in a direction against the stop arm 33, a predetermined increment of rotary motion is imparted to the tire 5. The operator thereupon moves the cutting mechanism to its backward position and repeats a cycle of advance movement of the tire through the medium of the notched sheave 7. In a similar manner the operation is carried out until the entire circumference of the tire has been provided with spaced transverse slits.

The gauge member 46 has a curved shape substantially conforming with the cutting edge of the knife, so that that portion of the gauge which rests upon the tire will result in uniform depth of the slits, regardless of slight variations in the location of the cutting mechanism relative to the tire. If desired, the notches in the sheave 7 may be spaced at variable distances to provide variably spaced slits in the tire, thus obtaining a more quiet, operable tire.

By adjusting the crank 19 the sheaves 6 are moved toward or away from the sheave 7, and this adjustable feature permits the tire to be held with sufficient pressure so that the sheave 7 by contact engagement therewith is capable of rotating the tire, and of maintaining it in a substantially fixed position during the cutting operation.

When the cutting operation is completed, the operator lowers the sheaves 6 and removes the tire from the apparatus.

While I have shown and described a preferred embodiment of my invention, it is to be understood that it may be otherwise practiced within the scope of the appended claims.

Having thus described my invention, what I claim and desire to protect by Letters Patent is:

1. An apparatus for slitting treads of pneumatic tires, comprising a pair of sheaves adaptable for supporting a tire by peripheral engagement thereof, an indexing sheave substantially diametrically opposed to said pair of sheaves and adaptable for supporting the upper portion of a tire by peripheral engagement therewith, a rotary knife mounted for reciprocal movement transversely of the tread of a tire, and means for rotating the knife.

2. An apparatus for slitting treads of pneumatic tires, comprising a pair of sheaves adaptable for supporting a tire by peripheral engagement thereof, an indexing sheave substantially diametrically opposed to said pair of sheaves and adaptable for supporting the upper portion of a tire by peripheral engagement therewith, said indexing sheave having a plurality of notches, an arm engageable with the notches and a stop for limiting movement of the arm whereby manual operation of the arm imparts increments of rotary motion to a tire supported by the sheaves, a rotary knife mounted for reciprocal movement transversely of the tread of a tire, and means for rotating the knife.

3. An apparatus for slitting treads of pneumatic tires, comprising a pair of sheaves adaptable for supporting a tire by peripheral engagement thereof, an indexing sheave substantially diametrically opposed to said pair of sheaves and adaptable for supporting the upper portion of a tire by peripheral engagement therewith, a rotary knife mounted for reciprocal movement transversely of the tread of a tire, means for rotating the knife, a frame for supporting the rotary knife and the knife rotating means, a link member pivotally connected to the frame at an end thereof opposite said knife, and means cooperable with the knife when engaging a tire for supporting the knife end of the frame and for simultaneously limiting the depth of cut of the knife.

4. An apparatus for slitting treads of pneumatic tires, comprising a pair of sheaves adaptable for supporting a tire by peripheral engagement thereof, an indexing sheave substantially diametrically opposed to said pair of sheaves and adaptable for supporting the upper portion of a tire by peripheral engagement therewith, said indexing sheave having a plurality of notches, an arm engageable with the notches and a stop for limiting movement of the arm whereby manual operation of the arm imparts increments of rotary motion to a tire supported by the sheaves, a rotary knife mounted for reciprocal movement transversely of the tread of a tire, means for rotating the knife, a frame for supporting the rotary knife and the knife rotating means, a link member pivotally connected to the frame at an end thereof opposite said knife, and means cooperable with the knife when engaging a tire for supporting the knife end of the frame and for simultaneously limiting the depth of cut of the knife.

GEORGE F. WIKLE.